(12) United States Patent
Clark

(10) Patent No.: US 10,985,939 B2
(45) Date of Patent: Apr. 20, 2021

(54) AUTOMATIC ADDRESSING SCHEME FOR POOL SYSTEM CONTROLLERS AND COMPATIBLE REMOTE DEVICES

(71) Applicant: ZODIAC POOL SYSTEMS LLC, Vista, CA (US)

(72) Inventor: William J. Clark, Oceanside, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 139 days.

(21) Appl. No.: 15/067,081

(22) Filed: Mar. 10, 2016

(65) Prior Publication Data

US 2016/0269194 A1    Sep. 15, 2016

Related U.S. Application Data

(60) Provisional application No. 62/131,020, filed on Mar. 10, 2015.

(51) Int. Cl.
*H04L 12/40* (2006.01)
*H04L 29/06* (2006.01)
(Continued)

(52) U.S. Cl.
CPC .... *H04L 12/40013* (2013.01); *G06F 13/4282* (2013.01); *H04L 45/745* (2013.01); *H04L 61/1552* (2013.01); *G06F 2213/0052* (2013.01)

(58) Field of Classification Search
CPC ............ H04L 12/40013; H04L 45/745; G06F 2213/0052

(Continued)

(56) References Cited

U.S. PATENT DOCUMENTS 5,432,754 A * 7/1995 Brady .................... H04B 11/00
                                                        367/134
5,793,630 A * 8/1998 Theimer ................... G01S 5/16
                                                        340/10.42
(Continued)

OTHER PUBLICATIONS

International Patent Application No. PCT/US2016/021871, International Search Report and Written Opinion, dated May 23, 2016, 10 pages.

(Continued)

*Primary Examiner* — Asad M Nawaz
*Assistant Examiner* — Jason A Harley
(74) *Attorney, Agent, or Firm* — Kilpatrick Townsend & Stockton LLP; Dean W. Russell; Renae B. Wainwright

(57) ABSTRACT

Systems and methods are provided for automatically addressing devices of pool and spa systems in a communication network. The communication network includes at least a first transceiver and a second transceiver that are communicatively coupled via a communication network bus. The first transceiver is configured to transmit a query signal to the second transceiver on a first address on the communication network bus, where the query signal includes a command requesting identification data (e.g., a serial number) associated with the second transceiver from the second transceiver. After receiving a response from the second transceiver, the first transceiver verifies (e.g., validates) the identification data. The first transceiver then automatically addresses the second transceiver individually by transmitting an addressed signal that includes at least a portion of the verified identification data and a command to the second transceiver on a second address on the communication network bus.

20 Claims, 6 Drawing Sheets

(51) Int. Cl.
*G06F 13/40* (2006.01)
*G06F 13/36* (2006.01)
*G06F 13/42* (2006.01)
*H04L 12/741* (2013.01)
*H04L 29/12* (2006.01)

(58) Field of Classification Search
USPC ........................................................ 370/254
See application file for complete search history.

(56) References Cited

U.S. PATENT DOCUMENTS

| | | | | |
|---|---|---|---|---|
| 2003/0161332 A1* | 8/2003 | Ohno | ................ | H04L 12/2803 370/401 |
| 2005/0108208 A1* | 5/2005 | Aoki | ................... | G06Q 10/107 |
| 2007/0164850 A1* | 7/2007 | Spindler | ............. | G06K 7/0008 340/10.2 |
| 2010/0050104 A1* | 2/2010 | Stellari | ................. | G06F 13/385 715/771 |
| 2011/0074552 A1* | 3/2011 | Norair | ................. | G06K 7/0008 340/10.1 |
| 2012/0056755 A1* | 3/2012 | Hanft | ...................... | H04Q 9/00 340/870.07 |
| 2014/0336821 A1* | 11/2014 | Blaine | ................. | A61H 33/005 700/275 |
| 2014/0372306 A1* | 12/2014 | Joao | ....................... | G06Q 20/40 705/44 |
| 2015/0124597 A1* | 5/2015 | Mabuchi | ............... | H04L 12/413 370/230 |

OTHER PUBLICATIONS

European Application No. 16711753.0, Office Action dated Feb. 14, 2020, 3 pages.

\* cited by examiner

AUTOMATIC ADDRESSING SCHEME FOR POOL SYSTEM CONTROLLERS AND COMPATIBLE REMOTE DEVICES

REFERENCE TO RELATED APPLICATION

This application claims the benefit of U.S. Provisional Patent Application No. 62/131,020, entitled "Automatic Addressing Scheme for Pool System Controllers and Compatible Remote Devices," filed Mar. 10, 2015, the entirety of which is hereby incorporated by reference.

TECHNICAL FIELD

The present disclosure generally relates to addressing devices. More specifically, but not by way of limitation, this disclosure relates to automatically addressing devices in a communication network.

BACKGROUND

A communication network can include an arrangement of nodes (e.g., devices) that are connected to the communication network via a main cable or link referred to as a communication network bus. The devices may communicate (e.g., transmit or receive data) via the communication network bus. It may be desirable to control communication between the nodes in the communication network.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Disclosed are systems and methods for automatically addressing devices in a communication network. The communication network can include various devices that are communicatively connected via a bus (e.g., a communication network bus such as an RS485 bus).

In some examples, the communication network includes various devices (e.g., transceivers) that can communicate (e.g., transmit or receive data) via an address on a communication network bus. For example, the communication network may include a master device (e.g., a host device) and multiple slave devices (e.g., remote devices). In one non-limiting example, the communication network includes at least sixteen remote devices. The host device can communicate with the remote devices via the communication network bus. As an example, the host device can transmit a signal or data to each of the remote devices via an address on the communication network bus. In some examples, a signal transmitted by the host device via an address on the communication network bus is transmitted to each of the remote devices in the communication network. The signal may include a command for causing the remote devices to transmit a response signal. Each of the remote devices may be addressable, which can allow each remote device to be programmed to only respond to a signal that includes a specific address assigned to the transceiver (e.g., a device address).

In some examples, the host device may use identification data (e.g., a serial number) associated with each of the remote devices to automatically assign a specific address to each remote device. Automatically assigning a specific address to each remote device in the network can prevent multiple remote devices from responding to a command in a signal transmitted by the host device. Automatically addressing each device in the communication network using identification data associated with each of the devices can also allow each of the devices to be addressable without a jumper or a dual in-line package ("DIP") switch.

In one example, the host device can transmit a query signal to each remote device in the communication network via a first address on the communication network bus. The query signal may not include a specific device address, which allows each remote device in the communication network to respond to a command in the query signal. As an example, the query signal may include a command to cause each remote device that receives the query signal to transmit a response signal that includes identification data associated with the remote device to the host device via the first address on the communication network bus. For example, the query signal can cause each remote device to transmit a response signal that includes a serial number associated with the remote device to the host signal via the first address.

In some examples, a remote device may delay transmitting a response signal to the host device if the remote device detects data collision or a data error on the communication network bus. For example, the remote device may detect data collision if another remote device is simultaneously attempting to transmit a response signal to the host device via the first address on the bus. The remote device may delay transmitting the response signal for a period of time after detecting the data collision. Delaying transmission of a response signal can prevent additional data collision on the communication network bus.

Each of the remote devices can be automatically addressable using the identification data associated with each of the remote devices. For example, once the host device receives a response signal from a remote device, the host device can verify (e.g., validate) the identification data in the response signal. As an example, the host device can compare the identification data to data in a database (e.g., a look-up table) of valid identification data to ensure that the remote device is a valid device in the communication network. The host device can then transmit an addressed signal via a second address on the communication network bus after verifying the identification data in the response signal. The addressed signal can include at least a portion of the verified identification data (e.g., at least a portion of the serial number associated with the remote device) and a command. The addressed signal can be transmitted to each of the remote devices in the communication network that has transmitted valid identification data to the host device. In some examples, including at least a portion of the verified identification data in the addressed signal can cause only the remote device associated with the verified identification data to respond to the command in the addressed signal. In some examples, the remote device receives the addressed signal and communicates with the host device via the second address in response to receiving the addressed signal. In this manner, the host device may use identification data associated with each of the remote devices to automatically assign a specific address to each remote device, which can allow the host device to automatically address each remote device individually.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
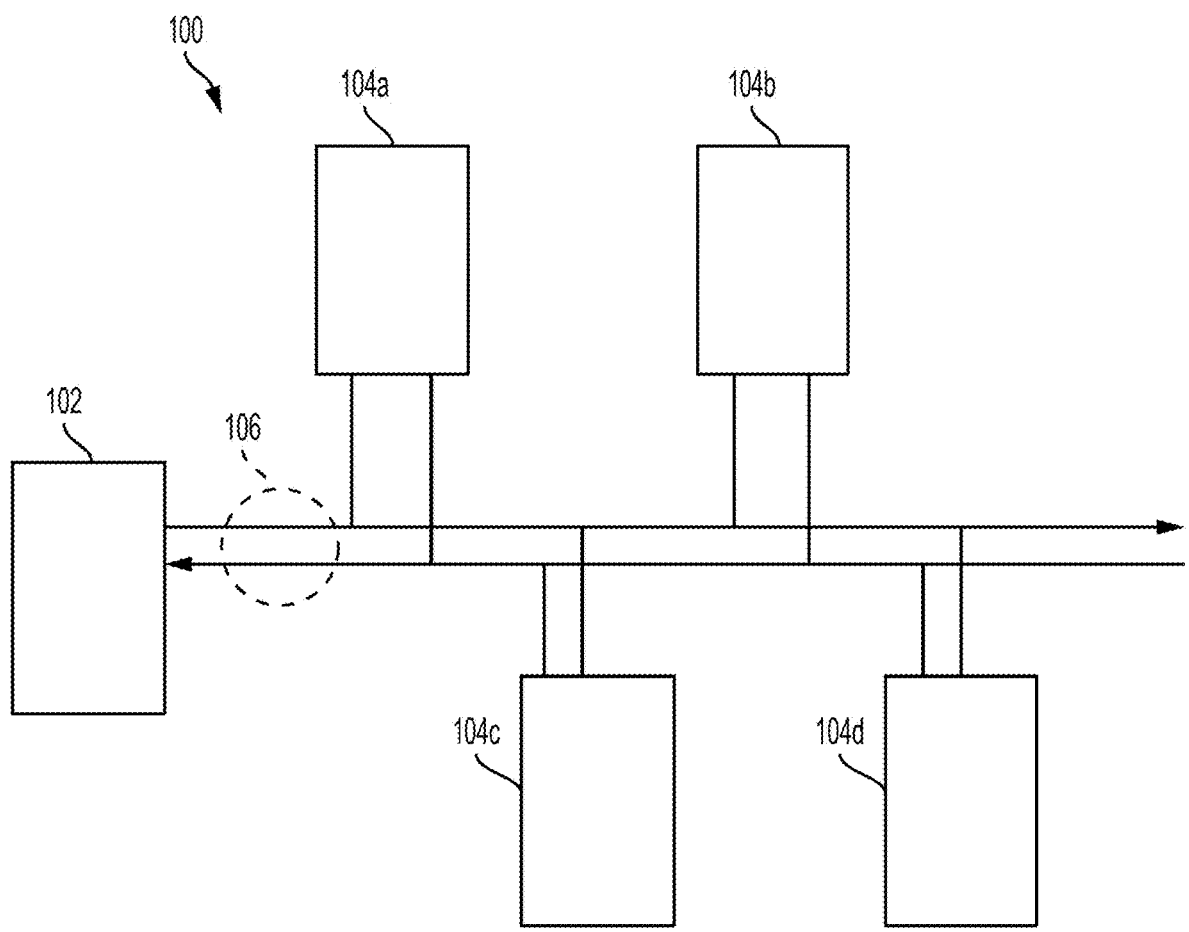
FIG. 1 is a block diagram depicting an example of a communication network that includes addressable devices.

The terms "invention," "the invention," "this invention" and "the present invention" used herein are intended to refer broadly to all of the subject matter of this patent application and the claims below. Statements containing these terms should be understood not to limit the subject matter described herein or to limit the meaning or scope of the patent claims below.

Disclosed are systems and methods for automatically addressing devices in a communication network.

Devices (e.g., transceivers and the like) in a communication network can communicate (e.g., transmit or receive data) via an address on a communication network bus (e.g., an RS485 bus). In some examples, a signal transmitted via the communication network bus is transmitted to each device in the communication network. In some examples, each device in the communication network is automatically addressable, which can include programming the devices to only respond to a signal that includes a specific address assigned to the device. In some examples, unique identification data associated with each device in the communication network (e.g., a serial number of each device) is used to automatically address each device. In some examples, automatically addressing each device using unique identification data can prevent multiple devices from responding to a command in a signal transmitted on the communication network bus. Automatically addressing each device in the communication network using unique identification data associated with each device can also allow each of the devices to be addressable without a jumper or a dual in-line package ("DIP") switch.

For example, a communication network can include a host device (e.g., a host transceiver) and various remote devices (e.g., remote transceivers). The host device can communicate with each of the remote devices via the communication network bus by transmitting a signal on the communication network bus. In some examples, a signal transmitted by the host device via the communication network bus is transmitted to each of the remote devices in the communication network. For example, the host device can transmit a query signal to each of the devices via a first address on the communication network bus. The query signal may include a command that causes each remote device in the communication network that receives the query signal to transmit a response signal to the host device via the first address on the communication network bus. The response signal can include identification data associated with the remote device, such as a unique serial number associated with the remote device.

In some examples, a remote device may delay transmitting a response signal to the host device if the remote device detects data collision or a data error on the communication network bus. For example, a remote device may detect data collision if another remote device is simultaneously attempting to transmit a response signal to the host device via the first address on the bus. The remote device may delay transmitting the response signal for a period of time after detecting the data collision. Delaying transmission of a response signal can prevent additional data collision on the communication network bus.

After receiving a response signal from the various remote devices, the host device can automatically address each of the remote devices using the identification data associated with each of the remote devices. For example, after the host device receives a response signal from a remote device in the communication network, the host device can verify (e.g., validate) the identification data in the response signal. As an example, the host device can compare the identification data to data in a database of valid identification data for devices in the communication network to determine if the identification data is valid or invalid.

The host device can then transmit an addressed signal via a second address on the communication network bus after verifying the identification data in the response signal. The addressed signal can include at least a portion of the verified identification data (e.g., at least a portion of the verified serial number associated with the remote device) and a command. The addressed signal can be transmitted to each remote device in the communication network that has transmitted valid identification data to the host device. In some examples, including at least a portion of a verified identification data in the addressing signal causes only the remote device associated with the verified identification data to respond to the command in the addressed signal. In some examples, the remote device can respond to the host device via the second address, as opposed to the first address used to transmit the query signal, in response to receiving the command in the addressed signal. In this manner, the host device can automatically address each remote device in the communication network individually by using unique identification data associated with each remote device.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples, but, like the illustrative examples, should not be used to limit the present disclosure.

FIG. 1 is a block diagram depicting an example of a communication network 100 that includes nodes or addressable devices 104a-d. Each of the addressable devices 104a-d can be any device or system. For example, each of the addressable devices 104a-d can be a remote device (e.g., a remote transceiver) for communicating (e.g., transmitting or receiving signals or data). In some examples, the addressable devices 104a-d are communicatively coupled to each other or to a host device 102 via a bus 106. An example of the bus 106 includes, but is not limited to, an RS485 bus. The host device 102 can be any device or system for communicating with each of the automatically addressable devices 104a-d including, for example, a transceiver. Examples of the host device 102 include, but are not limited to, AQUALINK® RS ONETOUCH™ from Jandy Pools, Inc., Jandy E-Pump™ Remote Controller from Jandy Pools, Inc., etc. In another example, the host device can be any pool system controller. Examples of the addressable devices 104a-d include, but are not limited to AQUALINK® RS from Jandy Pools, Inc., Jandy® E-Pump™ Remote Controller from Jandy Pools, Inc., a variable speed pump, home automatic systems, sanitation systems (e.g., salt water chlorine generators and the like), heaters, filters, interface boards for heaters or heat pumps, etc. In another example, the addressable devices 104a-d can be any remote device.

Although only one host device 102 and four addressable devices 104a-d are illustrated in FIG. 1, additional devices, such as additional host devices and/or addressable devices, may be connected to the bus 106. As a non-limiting example, at least sixteen addressable devices may be connected to the bus 106.

In some examples, the host device 102 transmits a signal or data to each of the addressable devices 104a-d via an address on the bus 106. In some examples, each of the addressable devices 104a-d receives the signal or data transmitted by the host device 102. Each addressable device 104a-d may be silent (e.g., not transmit signal or data) when the host device 102 or another device (e.g., another addressable device) is transmitting data on the bus 106.

In some examples, the host device 102 transmits a query signal to each of the addressable devices 104a-d via a query address on the bus 106. An example of the query address includes an unused address on the bus 106 (e.g., 0x7C). The query signal may include a command for causing each addressable device 104a-d to transmit a response signal to the host device 102 via the query address in response to receiving the query signal. As an example, the query signal may include a command for causing each addressable device 104a-d to transmit a response signal that includes identification data associated with each addressable device 104a-d. The identification data can include unique identification data associated with each of the addressable devices 104a-d. An example of the identification data includes, but is not limited to, a serial number associated with the addressable device 104a-d. For example, the addressable device 104a may transmit a response signal that includes a serial number associated with the addressable device 104a to the host device 102 via the query address in response to receiving the query signal on the query address. As another example, the addressable device 104b may transmit a separate response signal that includes a separate serial number associated with the addressable device 104b to the host device 102 via the query address in response to receiving the query signal on the query address.

In some examples, each of the addressable devices 104a-d may delay transmitting a response signal to the host device 102 in response to detecting data collision or data error on the bus 106. Data collision can occur on the bus 106 when multiple devices (e.g., the addressable devices 104a-d or the host device 102) are simultaneously attempting to communicate (e.g., transmit a signal) via the bus 106. As an example, data collision can occur if the addressable device 104a and the addressable device 104b are simultaneously attempting to communicate via the same address on the bus 106.

In some examples, each of the addressable devices 104a-d can delay transmitting a response signal after receiving the query signal from the host device 102 in response to detecting data collision on the bus. For example, the addressable device 104c may receive a query signal from the host device 102 via the query address. The addressable device 104c may detect data collision on the bus 106 if the addressable device 104b and the addressable device 104c are attempting to simultaneously transmit separate response signals to the host device 102 via the query address. The addressable device 104c may delay transmitting a response signal to the host device 102 in response to detecting the data collision and in response to determining that the addressable device 104b began transmitting the a response signal to the host device 102 first. For example, the addressable device 104c may delay transmitting the response signal for a random period of time or a set period of time. As an example, the addressable device 104c may delay transmitting the response signal for a period of time corresponding to at least five characters with each character being approximately 1 millisecond at 9600 bits per second. In another example, the addressable device 104c may delay transmitting the response signal for a period of time corresponding to up to five characters with each character being approximately 1 millisecond at 9600 bits per second. In still another example, the addressable device 104c may delay transmitting the response signal for a period of time corresponding to up to sixteen characters with each character being approximately 1 millisecond at 9600 bits per second. In some examples, delaying transmission of a response signal in response to detecting data collision can prevent additional data collision on the bus 106.

In some examples, the host device 102 verifies (e.g., validates) identification data included in a response signal received from each of the addressable devices 104a-d. After the host device 102 receives a response signal from each addressable device 104a-d that includes identification data associated with each addressable device 104a-d, the host device 102 can compare the identification data received from each addressable device 104a-d to data in a database or look-up table. The data in the database or look-up table can include valid identification data for devices in the communication network 100. The host device 102 can determine whether the identification data received from each addressable device 104a-d is valid based on the comparison. In some examples, the host device 102 stores the identification data received from the addressable devices 104a-d in the database in response to determining that the identification data is valid.

As an example, the host device 102 can receive a response signal from the addressable device 104a that includes a serial number associated with the automatically addressable device 104a. The host device 102 can compare the serial number to a database of valid serial numbers for devices in the communication network 100. The host device 102 can determine whether the serial number provided by the addressable device 104a is valid based on the comparison. For example, the host device 102 can determine that the serial number is valid if the serial number is included in the database of valid serial numbers for devices in the communication network 100. As another example, the host device 102 can determine that the serial number is invalid if the serial number is not included in the database. In some examples, the host device 102 can store the serial number in the data-base in response to determining that the serial number is valid.

In some examples, the host device 102 automatically addresses each of the addressable devices 104*a-d* after determining that the identification data received from the addressable devices 104*a-d* is valid. For example, the host device 102 can automatically program each of the addressable devices 104*a-d* to respond only to a signal that includes a specific address assigned to the addressable device 104*a-d* after verifying the identification data associated with the addressable device 104*a-d*. In some examples, the host device 102 may use a verified identification data (e.g., a verified serial number) associated with each automatically addressable device 104*a-d* to automatically address each addressable device 104*a-d*. Using verified identification data associated with each addressable device 104*a-d* to automatically assign a specific address to each addressable device 104*a-d* can allow the host device 102 to automatically address each remote device individually.

As an example, the host device 102 can transmit an addressed signal via a command address on the bus 106. In some examples, the command address is an unused address on the bus 106 (e.g., 0x7D) and is a separate address from the query address. The host device 102 can transmit the addressed signal after verifying identification data in the response signal provided by at least one of the addressable devices 104*a-d*. Each of the addressable device 104*a-d* may receive the addressed signal. The addressed signal can include at least a portion of the verified identification data received from the addressable devices 104*a-d* and a command. For example, the at least a portion of the verified identification data can be three byte serial number associated with one of the addressable devices 104*a-d*. In another example, the at least a portion of the verified identification data can be the least significant bit ("LSB") of the verified identification data associated with the one of the addressable devices 104*a-d*. The command can indicate data requested from the host device 102 or a function to be performed by the addressable devices 104*a-d* in response to receiving the addressed signal (e.g., transmit a signal including specific information).

In some examples, including at least a portion of the verified identification data in the addressed signal causes only the addressable device 104*a-d* associated with the verified identification data to response to a command in the addressed signal. For example, after the host device 102 receives a response signal from the addressable device 104*d* that includes a serial number associated with the addressable device 104*d* and verifies the serial number, the host device 102 can transmit an addressed signal that includes at least a portion of the serial number associated with the addressable device 104*d* and a command. In some examples, each of the addressable devices 104*a-d* may receive the addressed signal but only the addressable device associated with the at least a portion of the serial number (e.g., addressable device 104*d*) will respond to the command in the addressed signal. In some examples, the addressable device 104*d* responds to the command in the addressed signal by transmitting a signal to the host device 102 via the command address. In some examples, the addressed signal can cause the addressable device to communicate only via the command address (e.g., the addressable device may stop communicating via the query address). In this manner, the host device 102 may use identification data associated with each of the addressable devices 104*a-d* to automatically assign a specific address to each addressable device 104*a-d*, which allows the host device 102 to automatically address each addressable device 104*a-d* individually.

In some examples, automatically addressing each addressable device 104*a-d* in the communication network 100 using unique identification data associated with each addressable device 104*a-d* (e.g., a serial number associated with each addressable device 104*a-d*) prevents multiple addressable devices 104*a-d* from responding to a command in a signal transmitted by the host device 102 and intended for a particular addressable device 104*a-d*. Automatically addressing each addressable device 104*a-d* in the communication network 100 using identification data associated with each of the addressable devices 104*a-d* can also allow each of the addressable devices 104*a-d* to be addressed by the host device 102 without a jumper or a DIP switch.

Figure 2:
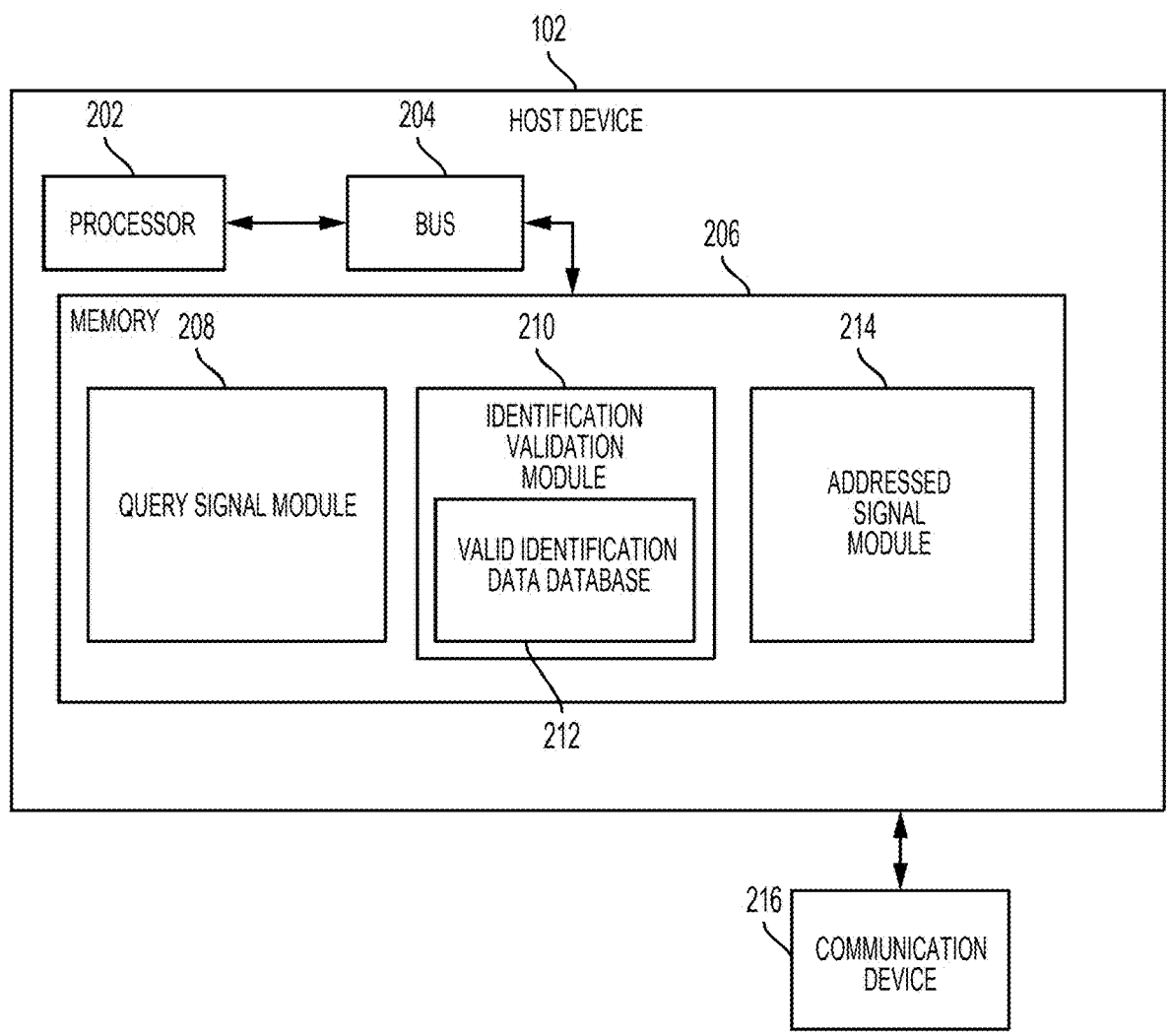
FIG. 2 is a block diagram depicting an example of the host device of FIG. 1.

FIG. 2 is a block diagram depicting an example of the host device 102 of FIG. 1. In some examples, the host device 102 includes a processor 202, a bus 204, a memory 206, and a communication device 216. In some examples, the components shown in FIG. 2 (e.g., the processor 202, the bus 204, the memory 206, and the communication device 216) are integrated into a single structure, although they need not be. For example, the components can be housed within a single housing or chassis, or may be distributed (e.g., in separate housings) and in electrical communication with each other.

The processor 202 can execute one or more operations for operating the host device 102. The processor 202 can execute instructions stored in the memory 206 to perform the operations. The processor 202 may include one processing device or multiple processing devices. Non-limiting examples of the processor 202 include a Field-Programmable Gate Array ("FPGA"), an application-specific integrated circuit ("ASIC"), a microprocessor, etc.

The processor 202 can be communicatively coupled to the memory 206 via the bus 204. The memory 206 may include any type of memory device that retains stored data when powered off. Non-limiting examples of the memory 206 include electrically erasable and programmable read-only memory ("EEPROM"), flash memory, or any other type of non-volatile memory. In some examples, at least some of the memory 206 includes a computer-readable medium from which the processor 202 can read instructions. The computer-readable medium can include electronic, optical, magnetic, or other storage devices capable of providing the processor 202 with computer-readable instructions or other program code. Non-limiting examples of computer readable-medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The host device 102 can communicate (e.g., transmit or receive a signal or data) via the communication device 216. For example, the host device 102 can communicate with an addressable device (e.g., the addressable devices 104*a-d* of FIG. 1) or any other device (e.g., another transceiver or another host device) via the communication device 216. In some examples, the communication device 216 represents one or more of any components that facilitate a network connection.

The memory 206 can include various modules 208, 210, 212, and 214 for automatically addressing devices (e.g., the addressable devices 104*a-d*) in a communication network (e.g., the communication network 100 of FIG. 1). The memory 206 can include a query signal module 208 for generating and transmitting a query signal on a communication network bus (e.g., the bus 106 of FIG. 1). The query signal module 208 can include instructions for causing the host device 102 to transmit the query signal to multiple addressable devices in a communication network. The query signal module 208 can include instructions for causing the host device 102 to transmit the query signal over a specific query address on the communication network bus. For example, the query signal module 208 can cause the host device 102 to transmit the query signal over an unused address (e.g., 0x7C) on the communication network bus.

The query signal module 208 can cause the host device 102 to include a command in the query signal for causing each addressable device that receives the query signal to transmit a response signal that includes identification data associated with the addressable device to the host device 102 via the query address in response to receiving the query signal. In some examples, the host device 102 can receive the response signal from the addressable device via the communication device 216.

In some examples, the memory 206 includes an identification validation module 210. The identification validation module 210 can include instructions for causing the host device 102 to receive a response signal from an addressable device (e.g., the addressable devices 104a-d of FIG. 1) that includes identification data (e.g., a serial number) associated with the addressable device and verify (e.g., validate) the identification data. For example, the identification validation module 210 can include a valid identification data database 212. The valid identification data database 212 can include a look-up-table or other database that stores values of valid identification data for devices in the communication network. The identification validation module 210 can include instructions for causing the host device 102 to compare the identification data received by the host device 102 from an addressable device to values of valid identification data in the valid identification data database 212. The identification validation module 210 can include instructions for causing the host device 102 to determine a validity of the identification data received from the addressable device based on the comparison. As an example, the identification validation module can include instructions for causing the host device 102 to determine that a serial number received from an addressable device is invalid if the serial number is not included in the valid identification data database 212. As another example, the identification validation module can include instructions for causing the host device 102 to determine that the serial number received from the addressable device is valid if the serial number is included in the identification data database.

In some examples, the host device 102 stores the identification data received from the addressable devices in response to determining that the identification data is valid. For example, the identification validation module 210 includes instructions for causing the host device to store identification data received from an addressable device after verifying the identification data. For example, the identification validation module 210 can include instructions for causing the host device to store verified identification data in the valid identification data database 212.

In some examples, the memory includes an addressed signal module 214. The addressed signal module 214 can include instructions for causing the host device 102 to automatically address an addressable device individually after determining that identification data received from the addressable device is valid. In some examples, the addressed signal module 214 includes instructions for causing the host device 102 to automatically program an addressable device to respond only to a signal that includes a specific address assigned to the addressable device after verifying the identification data received from the addressable device. For example, the addressed signal module 214 can cause the host device 102 to use verified identification data (e.g., at least a portion of a verified serial number) associated with the addressable device to automatically address the addressable device.

As an example, the addressed signal module 214 can cause the host device 102 to transmit an addressed signal via a command address on the communication network bus. In some examples, the addressed signal module 214 can cause the host device to select a command address (e.g., 0x7D) that is different from the query address used to transmit the query signal. The addressed signal can include at least a portion of the verified identification data associated with an addressable device, along with a command, and may be transmitted to multiple addressable devices. For example, the addressed signal module 214 can cause the host device 102 to include a three byte serial number associated with the addressable device in the addressed signal. In another example, the addressed signal module 214 can cause the host device 102 to include a least significant bit ("LSB") of the serial number in the addressed signal. In some examples, a LSB is a bit in position in a binary integer giving the units value, that is, determining whether the number is even or odd. In another example, the LSB is the bit that is farthest to the right (e.g., last) in a binary number associated with the serial number. In some examples, each of the addressable devices in the communication network may receive the addressed signal but only the addressable device associated with the verified serial number can respond to a command in the addressed signal.

Figure 3:
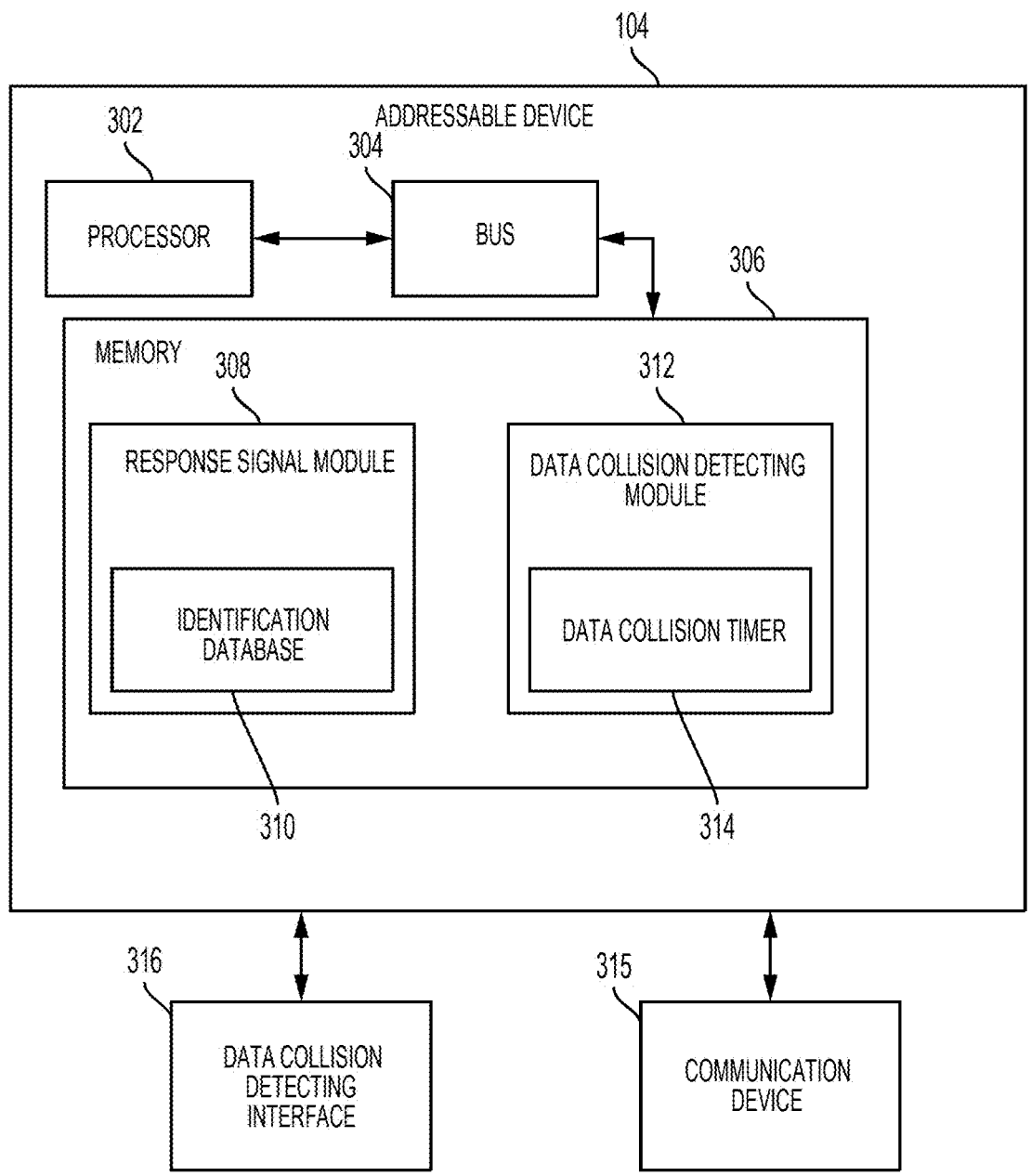
FIG. 3 is a block diagram depicting an example of an addressable device of FIG. 1.

FIG. 3 is a block diagram depicting an example of an addressable device 104 of FIG. 1. In some examples, the addressable device 104 includes a processor 302, a bus 304, a memory 306, a communication device 315, and a data collision detecting interface 316. In some examples, the components shown in FIG. 3 (e.g., the processor 302, the bus 304, the memory 306, the communication device 315, and the data collision detecting interface 316) are integrated into a single structure, although they need not be. For example, the components can be housed within a single housing or chassis, or may be distributed (e.g., in separate housings) and in electrical communication with each other.

The processor 302 can execute one or more operations for operating the addressable device 104. The processor 302 can execute instructions stored in the memory 306 to perform the operations. The processor 302 can be configured in substantially the same manner as the processor 202 of FIG. 2, although it need not be. The processor 302 can be communicatively coupled to the memory 306 via the bus 304, which can be configured in substantially the same manner as bus 304 of FIG. 2, although it need not be.

The addressable device 104 can communicate (e.g., transmit or receive data or signals) via the communication device 315. For example, the addressable device 104 can communicate with another addressable device (e.g., the addressable devices 104a-d of FIG. 1) or any other device (e.g., the host device 102 of FIG. 1 or any other devices) via the communication device 315. The communication device 315 can be configured in substantially the same manner as the communication device 216 of FIG. 2, although it need not be.

The memory 306 can be configured in substantially the same manner as the memory 206, although it need not be. In some examples, the memory 306 can include various modules 308 and 312.

In some examples, the memory 306 can include a response signal module 308. The response signal module 308 can include instructions for causing the addressable device 104 to receive a signal from a host device (e.g., the host device 102 of FIG. 1) and transmit a response signal to the host device. In some examples, the response signal module 308 can include instructions for causing the addressable device 104 to transmit the response signal in response to receiving a query signal from the host device. In some examples, the response signal module 308 can include instructions for causing the addressable device 104 to transmit the response signal based on a command in the query signal, such as a command requesting identification data, received from the host device. For example, the response signal module 308 can cause the addressable device 104 to transmit a response signal that includes identification data (e.g., a serial number) associated with the addressable device 104 in response to the command in the query signal requesting the identification data. In some examples, the response signal module 308 includes an identification database 310 that includes identification data associated with the addressable device 104. The response signal module 308 can include instructions for causing the addressable device to access the identification database 310 and retrieve the identification data for including the identification data in the response signal.

In some examples, the memory 306 includes a data collision detecting module 312. The data collision detecting module 312 can include instructions for causing the addressable device 104 to detect data collision on a network communication bus (e.g., the bus 106 of FIG. 1) prior to transmitting a response signal to the host device. In some examples, the data collision detecting module 312 can include instructions for causing the addressable device 104 to detect data collision on the network communication bus when multiple devices (e.g., the addressable devices 104a-d or the host device 102 of FIG. 1) are simultaneously attempting to communicate (e.g., transmit a signal) via the communication network bus. In some examples, the data collision detecting module 312 can include instructions for causing the addressable device 104 to detect data collision on the communication network bus using a data collision detecting interface 316.

Figure 4:
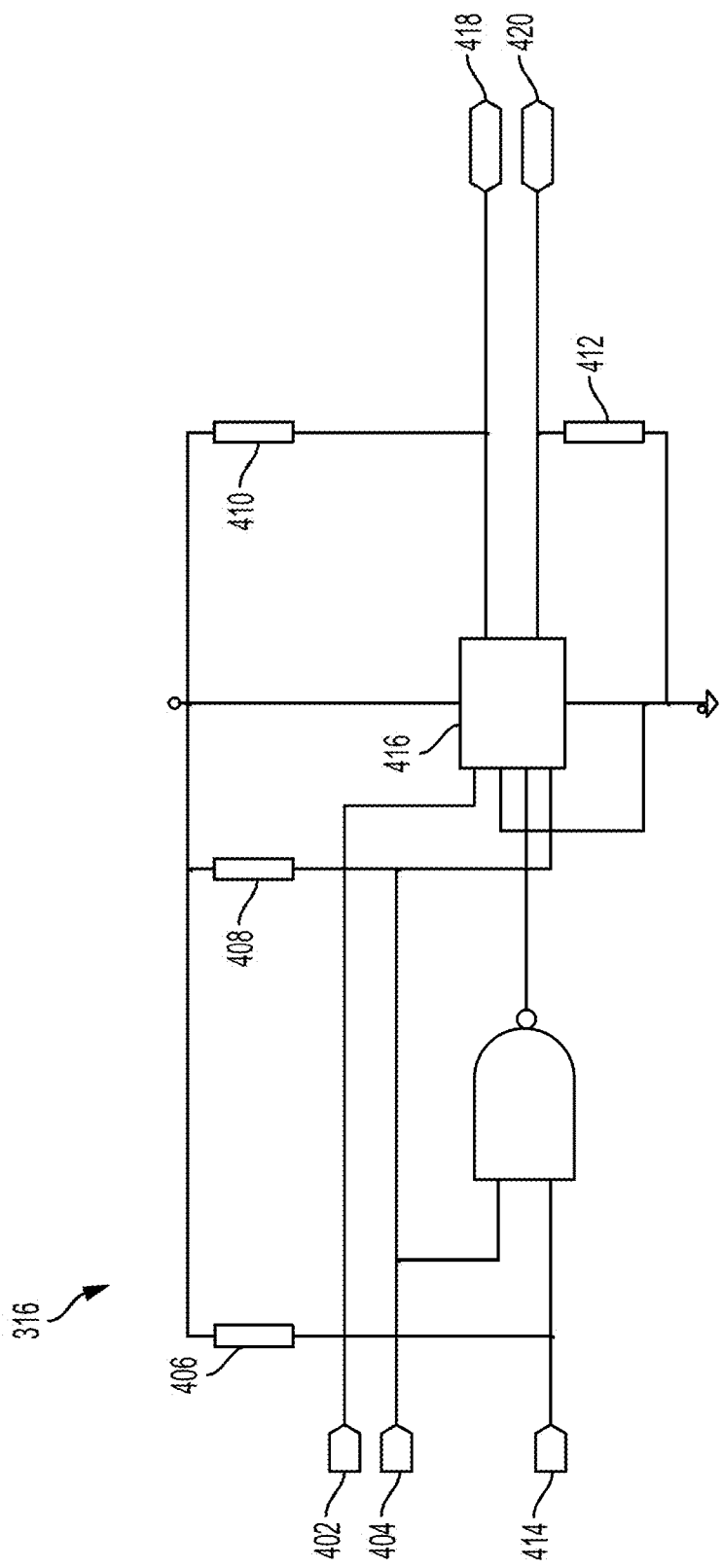
FIG. 4 is a schematic diagram depicting an example of a data collision detecting interface that can be included in an addressable device for detecting data collision on the network bus.

FIG. 4 is a schematic diagram depicting an example of a data collision detecting interface 316 that can be included in the addressable device 104 for detecting data collision on the network bus. In some examples, the data collision detecting interface 316 is communicatively coupled to a communication network bus (e.g., the bus 106 of FIG. 1).

The data collision detecting interface 316 can include a receiver 402 and a transmitter 404. In some examples, the data collision detecting interface 316 also includes resistors 406, 408, 410, 412, a detection device 416 that is interfaced with a communication network bus (e.g., the bus 106 of FIG. 1), and output signals 418, 420. The detection device may be interfaced with the communication network bus for detecting voltage on the communication network bus. In some examples, the detection device 416 may also be interfaced (e.g., coupled) to the receiver 402 and the transmitter 404 as depicted in FIG. 4. The data collision interface 316 may also include a controller 414. The controller 414 may control a direction of signals or data received by the receiver 402 or transmitted by the transceiver 404. For example, the controller 414 may be configured to allow the receiver 402 to only receive signals or data and to allow the transmitter 404 to only transmit data or signals. In some examples, the various components (e.g., the receiver 402, transmitter 404, resistors 406, 408, 410, 412, controller 414, detection device 416, and output signals 418, 420) of the data collision detecting interface 316 are electrically coupled, communicatively coupled, or otherwise connected as shown in FIG. 4.

The receiver 402 can be any device used by the addressable device to receive signals or data (e.g., from the host device 102 of FIG. 1 or another device). The transmitter 404 can be any device used by the addressable device to transmit data (e.g., transmit signals to the host device 102 or another device). In some examples, the transmitter can be set to an ON or OFF mode. Setting the transmitter to an ON mode allows the addressable device to transmit signals (e.g., to the host device 102 or other devices) and setting the transmitter to an OFF mode prevents the addressable device from transmitting signals. In some examples, the receiver can be set to an ON or OFF mode, which can allow the addressable device to receive signals (e.g., from a host device or another device) or prevent the addressable device from receiving signals, respectively.

In some examples, the addressable device uses the data collision detecting interface 316 to detect data collision on the communication network bus. For example, the addressable device can compare bytes of data received by the addressable device via the receiver 402 and bytes of data transmitted by the addressable device via the transmitter 404. In some examples, the addressable device uses this comparison to determine if there is data collision on the communication network bus.

For example, if the addressable device transmits data byte 0x55 (e.g., binary number 1010101) via the transmitter 404 and simultaneously receives data byte 0x54 (e.g., binary number 1010100) via the receiver 402 (e.g., from another addressable device), the addressable device can compare the data byte transmitted and the data byte received to determine that data collision occurred based on the comparison.

Returning to FIG. 3, in some examples, the addressable device 104 may not include the data collision detecting interface 316 and may detect data collision on the communication network bus by various methods or techniques or by using any device suitable for detecting data collision.

In some examples, the data collision detecting module 312 includes a data collision timer 314. The data collision timer 314 can include instructions for causing the addressable device 104 to delay transmitting a response signal to a host device in response to detecting data collision on the communication network bus. For example, the data collision timer 314 can include instructions for causing the addressable device 104 to delay transmitting the response signal for a random amount of time or a set amount of time. As an example, the data collision timer 314 can cause the addressable device 104 to delay transmitting the response signal to the host device for a period of time corresponding to at least five characters with each character being approximately 1 millisecond at 9600 bits per second. In another example, the data collision timer 314 can include instructions for causing the addressable device 104 to delay transmitting the response signal for a period of time corresponding to up to five characters with each character being approximately 1 millisecond at 9600 bits per second. In still another example, the data collision timer 314 can include instructions for causing the addressable device 104 to delay transmitting the response signal for a period of time corresponding to up to sixteen characters with each character being approximately 1 millisecond at 9600 bits per second. In some examples, the data collision timer 314 can cause the addressable device 104 to delay transmitting the response signal to prevent additional data collision on the communication network bus.

Figure 5:
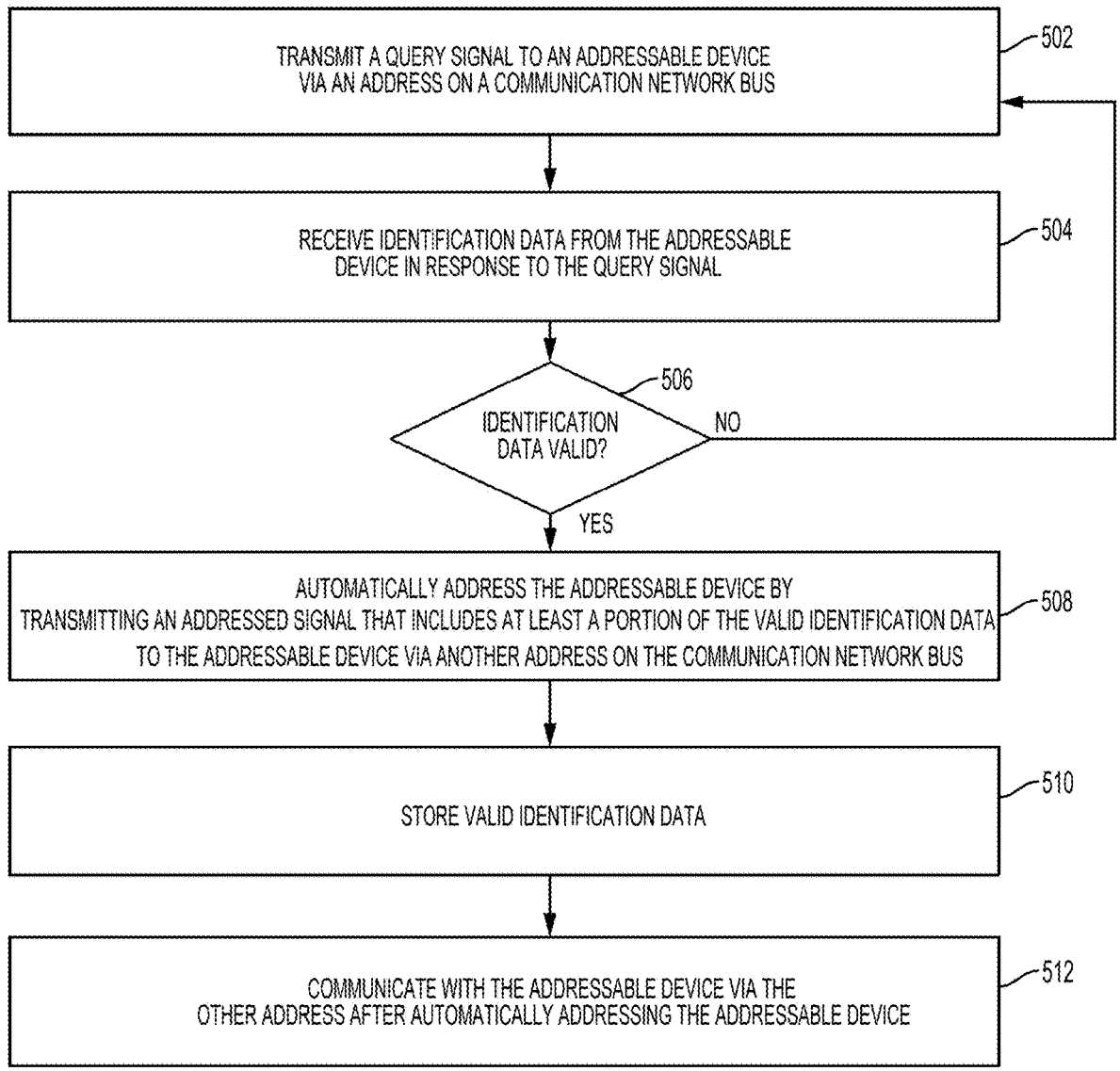
FIG. 5 is a flow chart depicting an example of a process for automatically addressing devices in a communication network.

FIG. 5 is a flow chart depicting an example of a process for automatically addressing devices in a communication network In block 502, a query signal is transmitted to an addressable device (e.g., the addressable devices 104*a-d* of FIG. 1) via an address on a communication network bus (e.g., the bus 106 of FIG. 1).

In some examples, a communication network (e.g., the communication network 100 of FIG. 1) includes a host device (e.g., the host device 102 of FIG. 1) and the addressable device. The communication network can also include the communication network bus, which allows the host device and the addressable device to communicate (e.g., transmit and receive data or signals) via addresses on the communication network bus.

In some examples, the host device transmits the query signal to the addressable device. For example, the host device can include memory that includes instructions for causing the host device to transmit the query signal to the addressable device via an address on the communication network bus (e.g., using the query signal module 208 and communication device 216 of FIG. 2). In some examples, the host device transmits the query signal on a query address or an unused address (e.g., 0x7C) on the communication network bus.

In block 504, identification data is received from the addressable device in response to the query signal. In some examples, the query signal transmitted by the host device (e.g., in block 502) includes a command that requests that the addressable device provide a response signal that includes identification data associated with the addressable device (e.g., a serial number associated with the addressable device). In some examples, the addressable device can receive the query signal and transmit the response signal that includes the identification data to the host device in response to receiving the query signal (e.g., using the response signal module 308 and identification database 310 of FIG. 3). The host device can include memory for causing the host device to receive the response signal that includes the identification data from the addressable device (e.g., using the communication device 216 of FIG. 2). As an example, the query signal can include a command that requests that the addressable device transmit a response that includes a complete serial number associated with the addressable device and the addressable device can transmit to the host device a response signal that includes the complete serial number in response to receiving the query signal.

In block 506, a validity of the identification data is determined. In some examples, the host device determines the validity of the identification data. For example, the host device includes memory that includes instructions for causing the host device to compare the identification data to data in a database that includes valid identification data for devices (e.g., using the identification validation module 210 and the valid identification data database 212 of FIG. 2). In some examples, the host device can determine the validity of the identification data based on the comparison.

For example, the host device can receive a response signal from the addressable device that includes a serial number of the addressable device. The host device can compare the serial number to valid serial numbers in the database to determine the validity of the serial number of the addressable device. As an example, the host device can determine that the serial number of the addressable device is valid if the serial number is included in the database. As another example, the host device can determine that the serial number of the addressable device is invalid if the serial number is not included in the database. In another example, the host device can determine that the serial number of the addressable device is invalid if the identification data is distorted (e.g., due to data collision on the bus).

If the host device determines that the identification data is invalid in block 506, the host device can transmit another query signal to the addressable device or another addressable devices (e.g., at block 502) and proceed to steps 504, 506, as described above.

If the host device determines that the identification data is valid, the host device proceeds to block 508. In block 508, the addressable device is automatically addressed by transmitting an addressed signal that includes at least a portion of the valid identification data to the addressable device via another address on the communication network bus. In some examples, the other address can be a command address and can be an unused address on the communication network bus (e.g., 0x7D) that is different from the query address used in block 502. In some examples, the host device can include memory for causing the host device to transmit the addressed signal to the addressable device via the other address.

In some examples, the addressed signal can be transmitted by the host device to multiple addressable devices in the communication network. In some examples, including at least a portion of the valid identification data in the addressed signal causes only the addressable device associated with the valid identification data (e.g., the addressable device transmitting the response signal that includes the validated identification data in block 504) to respond to a command in the addressed signal. In some examples, the addressable device associated with the valid identification data may communicate (e.g., transmit or receive data) via the other address in response to receiving the addressed signal (e.g., the addressable device may no longer communicate via the address in block 502).

In block 510, the valid identification data is stored. In some examples, the host device includes memory for causing the host device to store the valid identification data in a database that includes valid identification data for devices in the communication network (e.g., using the identification validation module 210 and valid identification data database 212 of FIG. 2).

In some examples, in block 512, the host device can communicate (e.g., transmit or receive signals) with the addressable device after automatically addressing the addressable device.

In some examples, the host device communicates with the addressable device via the other address (e.g., the command address) in response to the addressable device receiving the addressed signal (e.g., the addressed signal transmitted in block 508). For example, the host device can send additional signals to the addressable device via the other address and the addressable device can transmit a response signal if the additional signals include a command and portion of the identification data associated with the addressable device.

In this manner, the host device may use identification data associated with a plurality of addressable devices in the communication network to automatically assign a specific address to each addressable device, which can allow the host device to automatically address each addressable device individually.

Figure 6:
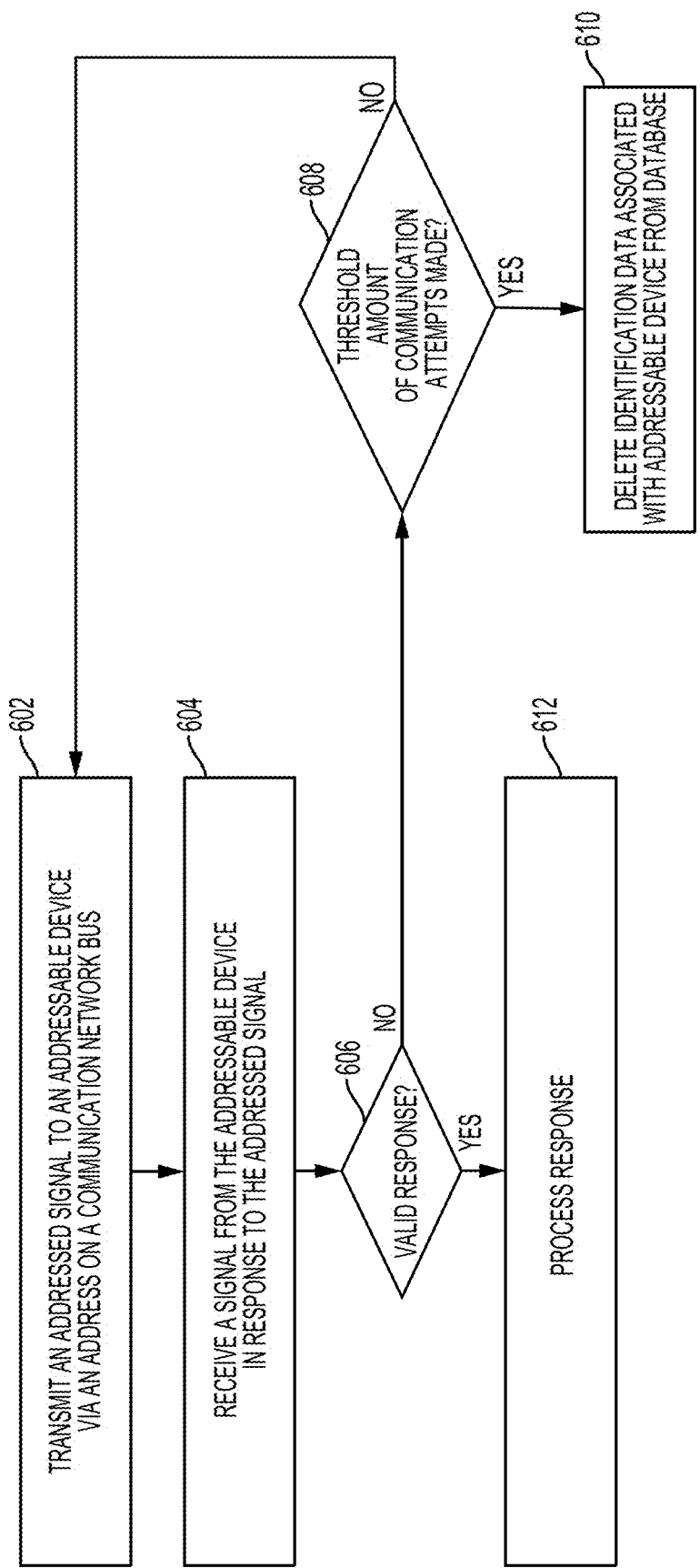
FIG. 6 is a flow chart depicting an example of a process for communicating with a device in a communication network after automatically addressing the device.

FIG. 6 is a flow chart depicting an example of a process for communicating with a device in a communication network after automatically addressing the device.

In block 602, an addressed signal is transmitted to an addressable device (e.g., the addressable devices 104a-d of FIG. 1) via an address on a communication network bus. In some examples, a host device (e.g., the host device 102 of FIG. 1) transmits the addressed signal via a command address on the communication network bus (e.g., the command address in block 508 of FIG. 5). In some examples, the host device transmits the addressed signal to the addressable device via the command address after the host device has automatically addressed the addressable device (e.g., in block 508 of FIG. 5). The addressed signal can include a command and at least a portion of valid identification data associated with the addressable device (e.g., identification data validated in block 506 of FIG. 5).

In block 604, a signal from the addressable device is received in response to the addressed signal. In some examples, the addressable device transmits a response signal based on receiving the addressed signal that includes at least a portion of the valid identification data associated with the addressable device and a command. For example, the at least a portion of the valid identification data associated with the addressable device allows the addressable device to generate the response signal that includes a response to the command included in the addressed signal and transmit the response signal to the host device via the command address.

In block 606, the host device determines if the response received by the host device from the addressable device (e.g., the response signal received in block 604) is valid. In some examples, the host device includes instructions for determining that the response is invalid (e.g., if the addressable device is damaged or faulty or if there are any communication issues between the addressable device and the host device, etc.).

If the response received by the host device from the addressable device is valid, the host device moves to block 612 described below.

If the response received by the host device from the addressable device is invalid, the host device at block 608 determines if a threshold amount of communication attempts have been made by the host device. The threshold amount of communication attempts can include a specific or predetermined number of times that the host device will attempt to obtain a valid response signal from the addressable device in response to an addressed signal. In some examples, an attempt to obtain a valid response includes transmitting an addressed signal that includes at least a portion of valid identification associated with the addressable and a command device to the addressable device via a command address on a network bus (e.g., in block 602).

As an example, the threshold amount of communication attempts can be five attempts or any other number of attempts by the host device to obtain a valid response signal in response to the addressed signal transmitted by the host device to the addressable device via the command address. In some examples, if the host device has transmitted five addressed signals, or any other suitable number of attempts, to the addressable device and obtained five invalid responses (or any suitable number of invalid responses), the host device determines that the threshold amount of communication attempts have been made.

If the host device has made the threshold amount of communication attempts, the host device proceeds to block 610.

If the threshold amount of communication attempts have not been made by the host device, the host device transmits another addressed signal to the addressable device or another addressable devices via the command address (e.g., at block 602).

In block 610, if the host device determines that the threshold amount of communication attempts have been made by the host device, the host device can delete identification data associated with the addressable device from a database (e.g., the valid identification data database 212 of FIG. 2).

In block 612, if the host device receives a valid response from the addressable device, the host device processes the response or response signal received from the addressable device.

The disclosed systems can be retrofit with existing systems with communication buses, or may be incorporated into new systems with communication buses.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method for automatically addressing pool and spa system controllers, the method comprising:
   transmitting, by a first transceiver, a query signal to a second transceiver via a first address on a communication network bus;
   receiving, by the first transceiver, identification data associated with the second transceiver from the second transceiver via the first address in response to the query signal;
   determining, by the first transceiver, a validity of the identification data, the validity indicating that the second transceiver is permitted to communicate on the communication network bus, wherein determining the validity of the identification data comprises:
      accessing, by the first transceiver, a look-up-table comprising a plurality of valid identification data associated with a plurality of transceivers validated for the communication network bus;
      comparing, by the first transceiver, the identification data to the plurality of valid identification data in the look-up-table; and
      determining the validity of the identification data based on the comparison; and
   assigning, by the first transceiver and in response to determining that the identification data is valid, a second address on the communication network bus to the second transceiver by transmitting an addressed signal to the second transceiver via the second address, wherein the addressed signal includes at least a portion of the identification data and causes the second transceiver to communicate with the first transceiver via the second address.

2. The method of claim 1, wherein the identification data comprises a serial number associated with the second transceiver.

3. The method of claim 1, wherein the at least a portion of the identification data is a least significant bit of the identification data.

4. The method of claim 1, wherein determining the validity of the identification data includes:

storing, by the first transceiver, the identification data in the look-up-table in response to determining that the identification data is valid.

5. The method of claim 1, further comprising:
deleting, by the first transceiver, the identification data associated with the second transceiver from the look-up-table in response to determining that a threshold amount of invalid response signals has been received from the second transceiver in response to subsequent addressed signals transmitted by the first transceiver to the second transceiver via the second address.

6. The method of claim 1, wherein receiving the identification data from the second transceiver via the first address in response to the query signal includes:
receiving, by the first transceiver, the identification data from the second transceiver after a delay based on the second transceiver detecting a data error on the communication network bus.

7. A system for automatically addressing pool and spa system controllers, the system comprising:
a first transceiver; and
a second transceiver communicatively coupled to the first transceiver via a communication network bus, wherein the first transceiver is operable for:
transmitting a query signal to the second transceiver on a first address on the communication network bus;
receiving identification data associated with the second transceiver via the first address in response to the query signal;
determining a validity of the identification data, the validity indicating that the second transceiver is permitted to communicate on the communication network bus, wherein determining the validity of the identification data comprises:
accessing a look-up-table comprising a plurality of valid identification data associated with a plurality of transceivers validated for the communication network bus;
comparing the identification data to the plurality of valid identification data in the look-up-table; and
determining the validity of the identification data based on the comparison; and
assigning, in response to determining that the identification data is valid, a second address on the communication network bus to the second transceiver by transmitting an addressed signal to the second transceiver on the second address, wherein the addressed signal includes at least a portion of the identification data and causes the second transceiver to communicate with the first transceiver via the second address.

8. The system of claim 7, wherein the identification data includes a serial number associated with the second transceiver.

9. The system of claim 7, wherein the at least a portion of the identification data is a least significant bit of the identification data.

10. The system of claim 7, wherein the first transceiver comprises:
a processing device; and
a memory device in which instructions executable by the processing device are stored for causing the processing device to:
store the identification data in the look-up-table in response to determining that the identification data is valid.

11. The system of claim 10, wherein the memory device further comprises instructions executable by the processing device for causing the processing device to delete the identification data associated with the second transceiver from the look-up-table in response to determining that a threshold amount of invalid response signals have been received from the second transceiver in response to subsequent addressed signals transmitted by the first transceiver to the second transceiver via the second address.

12. The system of claim 7, wherein the second transceiver comprises:
a processing device; and
a memory device in which instructions executable by the processing device are stored for causing the processing device to:
detect a data error on the communication network bus; and
transmit identification data associated with the second transceiver to the first transceiver after a delay in response to detecting the data error on the communication network bus.

13. The system of claim 7, wherein the first address on the communication network bus is different from the second address on the communication network bus.

14. A communication system for pool and spa systems, the communication system comprising:
a host device; and
a plurality of transceivers communicatively coupled to each other and the host device via a communication network bus, wherein the host device is operable for:
transmitting a query signal on a first address on the communication network bus to each transceiver of the plurality of transceivers;
receiving identification data associated with each transceiver of the plurality of transceivers on the first address in response to the query signal;
determining a validity of the identification data associated with each transceiver of the plurality of transceivers, the validity indicating that each transceiver of the plurality of transceivers is permitted to communicate on the communication network bus, wherein determining the validity of the identification data comprises:
accessing a look-up-table comprising a plurality of valid identification data associated with a plurality of validated transceivers validated in a communication network;
comparing the identification data to the plurality of valid identification data in the look-up-table; and
determining the validity of the identification data based on the comparison; and
assigning, in response to determining that the identification data associated with one transceiver of the plurality of transceivers is valid, a second address on the communication network bus to the one transceiver of the plurality of transceivers by transmitting an addressed signal to the one transceiver on the second address on the communication network bus, wherein the addressed signal includes at least a portion of the identification data associated with the one transceiver and causes the one transceiver to communicate with the host device via the second address.

15. The communication system of claim 14, wherein the identification data associated with the one transceiver is a serial number of the one transceiver and the addressed signal includes a command and causes the one transceiver to respond to the command based at least in part on the serial number in the addressed signal.

16. The communication system of claim 14, wherein the at least a portion of the identification data associated with the at least one transceiver is a least significant bit of the identification data.

17. The communication system of claim 14, wherein the first address on the communication network bus is different from the second address on the communication network bus.

18. The communication system of claim 14, wherein the host device is operable for receiving a delayed response from a transceiver in the plurality of transceivers based on the transceiver detecting a data collision on the communication network bus, and wherein the data collision indicates that the one transceiver and another transceiver are simultaneously transmitting identification data to the host device.

19. The communication system of claim 14, wherein the host device comprises:
   a processing device; and
   a memory device in which instructions executable by the processing device are stored for causing the processing device to:
      store the identification data associated with each transceiver in the plurality of transceivers in the look-up-table in response to determining that the identification data is valid.

20. The communication system of claim 19, wherein the memory device further includes instructions executable by the processing device for causing the host device to delete the identification data associated with the transceiver from the look-up-table in response to determining that a threshold amount of invalid response signals have been received from the transceiver in response to subsequent addressed signals transmitted by the host device to the transceiver via the second address.

* * * * *